United States Patent
Ramond et al.

(10) Patent No.: US 8,875,565 B2
(45) Date of Patent: Nov. 4, 2014

(54) DEVICE INCORPORATING A PRESSURE SENSOR FOR MEASURING PRESSURES WITHIN AN INTERNAL COMBUSTION ENGINE

(75) Inventors: Alain Ramond, Merville (FR); John Burrows, Northwich Cheshire (GB); Sandro Goretti, Rubiera (IT)

(73) Assignees: Continental Automotive France, Toulouse (FR); Federal-Mogul Italy SRL, Carpi (MO) (IT)

( * ) Notice: Subject to any disclaimer, the term of this patent is extended or adjusted under 35 U.S.C. 154(b) by 239 days.

(21) Appl. No.: 13/062,346

(22) PCT Filed: Sep. 4, 2009

(86) PCT No.: PCT/FR2009/001063
§ 371 (c)(1),
(2), (4) Date: May 11, 2011

(87) PCT Pub. No.: WO2010/066956
PCT Pub. Date: Jun. 17, 2010

(65) Prior Publication Data
US 2012/0011924 A1  Jan. 19, 2012

(30) Foreign Application Priority Data
Sep. 8, 2008 (FR) ...................................... 0804923

(51) Int. Cl.
*G01M 15/08* (2006.01)
*G01L 23/10* (2006.01)
*F23Q 7/00* (2006.01)

(52) U.S. Cl.
CPC ........... *G01L 23/10* (2013.01); *F23Q 2007/002* (2013.01)
USPC ........................................................ 73/114.19

(58) Field of Classification Search
CPC ..................................................... G01M 15/08
USPC ............................. 73/114.16, 114.18, 114.19
See application file for complete search history.

(56) References Cited

U.S. PATENT DOCUMENTS

| 8,217,309 B2* | 7/2012 | Burrows et al. ............... 219/267 |
| 2007/0266980 A1* | 11/2007 | Boucard et al. ........... 123/145 A |

(Continued)

FOREIGN PATENT DOCUMENTS

| DE | 102006008639 A1 | 6/2007 |
| DE | 102006059693 A1 | 6/2008 |

(Continued)

OTHER PUBLICATIONS

International Search Report, dated Dec. 2, 2009, from corresponding PCT application.

*Primary Examiner* — Eric S McCall
(74) *Attorney, Agent, or Firm* — Young & Thompson

(57) ABSTRACT

This device includes an outer casing having: a first tubular zone (16) to the inside of which a finger (4) is fastened; a second tubular zone (40) of larger outside diameter than that of the first tubular zone (16) and extending the first tubular zone (16); and an elastically deformable part (18) of annular shape, extending in a plane transverse to the first tubular zone (16) and connecting the first tubular zone (16) to the second tubular zone (40). The pressure sensor (8) is placed between, on one side, an element (30) integral with the finger and, on the other side, a fixed element (20), called an interface, which is integral with the second tubular zone (40). The interface (20) has an axial contact zone (42) for contact with an element constituting the second tubular zone.

20 Claims, 3 Drawing Sheets

(56) References Cited

U.S. PATENT DOCUMENTS

| | | |
|---|---|---|
| 2009/0056663 A1 | 3/2009 | Ramond et al. |
| 2009/0165739 A1 | 7/2009 | Kern et al. |
| 2010/0147822 A1* | 6/2010 | Burrows et al. ............... 219/267 |
| 2010/0186490 A1* | 7/2010 | Burrows et al. ............ 73/114.19 |
| 2011/0192358 A1* | 8/2011 | Ramond et al. .................. 123/2 |

FOREIGN PATENT DOCUMENTS

| | | |
|---|---|---|
| EP | 1096141 A2 | 5/2001 |
| FR | 2884299 A1 | 10/2006 |

* cited by examiner

DEVICE INCORPORATING A PRESSURE SENSOR FOR MEASURING PRESSURES WITHIN AN INTERNAL COMBUSTION ENGINE

BACKGROUND OF THE INVENTION

1. Field of the Invention

The present invention concerns a device integrating a pressure sensor for measuring pressures in an internal combustion engine.

2. Description of the Related Art

In an internal combustion engine, in particular a Diesel engine, each cylinder typically has a glow plug for heating the interior of the corresponding combustion chamber, in particular when starting the engine. This glow plug is located in a threaded bore that passes through the cylinder head of the engine. This glow plug therefore includes a threaded body adapted to be fitted into the corresponding bore of the cylinder head and a finger in which a preheating electrode is housed.

It is also known to integrate a pressure sensor into such a glow plug. Indeed, it has been noticed that a knowledge of the value of the pressure inside each cylinder made it possible to improve control of the combustion in the engine. This information is then used to regulate the injection of fuel into each of the cylinders. In this way, pollutant emissions from the engine can be reduced and fuel consumption optimized.

In prior art glow plugs integrating a pressure sensor, the latter is often housed in a portion of the body of the glow plug called the glow plug head or mounted on the glow plug head. The latter is the portion of the body of the glow plug that is outside the cylinder. The document EP-1 096 141 discloses one such glow plug, for example.

In these glow plugs, it is necessary to transmit the pressure in the corresponding cylinder in the engine to the pressure sensor located outside the engine, in or on the glow plug head. Various assemblies have been described such that the forces exerted on the finger of the glow plug situated in the cylinder are passed on to the pressure sensor. Various mechanical parts are then inserted between the pressure sensor and the finger of the glow plug. These various intermediary parts influence the measurement made.

The document FR-2 884 299 proposes a glow plug including a tubular body with a glow plug head and a fixing zone for fixing it into a bore, a finger mounted on the body of the glow plug at the opposite end to the glow plug head, and a pressure sensor. In such glow plugs, the finger is fixed to the glow plug body so as to be fastened thereto in a connecting zone, and the glow plug body has, between its connecting zone connected to the finger and its zone for fixing it into a bore, an elastically deformable part such that said connecting zone is movable and can be moved in the longitudinally relative to the fixing zone in a bore that is assumed to be fixed. The pressure sensor is located between a member fastened to the connecting zone and a fixed member of the glow plug.

In this way, the elastically deformable part acts as a membrane that divides the body of the glow plug into two parts, a fixed part intended to be mounted in a cylinder head and a movable part subjected to the pressure in a cylinder of the corresponding engine. This membrane can be deformed and the movable part can be moved longitudinally. That movement, which depends on the pressure in the cylinder is then transmitted to the pressure sensor, which can thus give an indication of the pressure exerted on the finger of the glow plug. With this kind of glow plug, the measurement from the pressure sensor is no longer disturbed by unwanted vibrations. Indeed, the movement of the membrane is not affected by the stresses in the cylinder head or in the rest of the body of the glow plug.

The documents DE-10 2006 008 639 and DE-10 2006 059 693 show glow plugs integrating a pressure sensor. In these plugs, the pressure sensor is placed between a fixed part, fastened to the body of the plug, and disposed above the sensor (that is to say at the opposite end to the finger), and the finger transmits, via insulating parts, the exterior pressure to which it is subjected. A part, named elastic membrane, connects the finger to the exterior of the plug to dissipate the heat and not influence the pressure measurements. The function of the elastic membrane described in each of these documents is entirely different from that described in the document FR 2 884 299.

It is also known, in Diesel engines (generally large cubic capacity engines), and petrol engines, to have a dedicated device for measuring the pressure in the combustion chambers of the engine. Such a of device then includes a body having means for fixing it into a cylinder head and inside which a pressure sensor is located. The present invention also relates to such pressure measuring devices. In the remainder of the description, when plugs or glow plugs are referred to, pressure measuring devices are also concerned, which are sometimes known as SAPS (Stand Alone Pressure Sensors), but for simplicity these are not explicitly mentioned.

A glow plug is fitted, as indicated above, by screwing the glow plug into a threaded bore. To provide a seal, an abutment is provided at the end of screwing. This abutment is conical and receives a bearing cone made on the body of the glow plug. When tightening the glow plug, the bearing cone comes up against the conical abutment of the cylinder head and a tightening torque is exerted to ensure a good seal between the glow plug body and the cylinder head. Because of this tightening torque, reaction forces are induced at the surface of contact between the glow plug body and the cylinder head. These forces are normal to the conical contact surface and therefore have a longitudinal component and a radial component relative to the glow plug body.

In the case of a glow plug as described in the aforementioned document FR-2 884 299, the bearing cone is in the immediate vicinity of the elastically deformable portion, also referred to as a membrane. Because of this, the forces induced by the tightening torque create a torque acting on the membrane that impacts on the prestressing exerted on the pressure sensor of the glow plug described. As a function of the tightening torque, the torque acting on the membrane varies and thus likewise the prestressing of the pressure sensor. Thus, if a glow plug is removed and then refitted, the tightening torque being produced by the torque wrench, there should not be any significant impact on the prestressing of the pressure sensor. However, the forces at the bearing surface do not depend only on the tightening torque but also on the conditions under which this tightening is effected: state of the threads of the glow plug and in the cylinder head, presence or absence of lubricant, etc. For the same tightening torque, forces can be induced at the bearing surface of the glow plug on the conical bearing surface of the cylinder head that vary by a factor of from one to two.

The above remarks are equally applicable to a stand-alone pressure sensor produced according to the teaching of the aforementioned French document.

BRIEF SUMMARY OF THE INVENTION

Thus an object of the present invention is to provide means for optimum measurement of the pressure inside a cylinder of an internal combustion engine without being influenced in particular by fitting and removing a glow plug integrating a pressure sensor (or a stand-alone pressure sensor). The pressure measurements are advantageously not affected, or are affected as little as possible, by the deformation of the cylinder head in which the glow plug (or the stand-alone pressure sensor) is mounted.

Another object of the invention is to provide means for producing a relatively high torque for tightening the glow plug into its cylinder head in order to ensure a good seal but without risk of inducing forces up to the point of removing the load from the sensitive (piezo-electric or like) member of the pressure sensor, i.e. cancelling the prestressing of that sensitive member.

To this end, the invention provides a device integrating a pressure sensor for measuring pressures in an internal combustion engine, including an exterior envelope having:
 a first tubular zone inside which a finger is fixed,
 a second tubular zone of greater outside diameter than the first tubular zone and extending the first tubular zone, and
 an annular elastically deformable portion lying in a plane transverse to the first tubular zone and connecting the first tubular zone and the second tubular zone,
the pressure sensor being located between a member attached to the finger and a fixed member called the interface that is attached to the second tubular zone.

According to the present invention, the interface has a zone of axial contact with a member constituting the second tubular zone.

In this way, the interface can serve as an axial abutment if forces tend to act on the elastically deformable part to displace it toward the interior of the device.

The elastically deformable part, also called membrane hereinafter, enables a mechanical link to be provided between the first tubular zone and the second tubular zone leaving only one degree of freedom between these two zones, i.e. the axial (or longitudinal) movement of one relative to the other.

One embodiment of the present invention, enabling in particular the axial abutment to be formed, provides for the interface to have a zone called lateral contact zone corresponding either to a lateral bearing zone between the interface and an interior face of the second tubular zone or to a zone of the interface having an outside diameter corresponding to the outside diameter of the second tubular zone, and for the thickness of the exterior wall of the device between the membrane and the interface, that is to say below the lateral contact zone, to be greater than the thickness of the exterior wall of the device just above the lateral contact zone.

For improved transmission of forces to the pressure sensor, the elastically deformable part forms for example a single part with the first tubular zone. In such a variant embodiment, the part integrating both the elastically deformable part and the first tubular zone has for example at least one zone of the same outside diameter as the second tubular zone.

In a device according to the invention, the member fastened to the finger is advantageously pre-stressed on the pressure sensor and the stress exerted on the pressure sensor preferably lessens when the finger is subjected to an exterior pressure. This makes it possible to have a compact structure, favorable to a good level of reliability of the measurements.

To limit also the impact of deformation of a cylinder head in which the device is intended to be mounted, the interface also has a lateral contact zone that is of small height compared to the second tubular zone, for example having a height less than one tenth of the height of the second tubular zone.

Still with the aim of limiting the impact of deformation of a cylinder head, the axial contact zone is preferably as close as possible to the elastically deformable part, for example less than 2 mm away from that part.

In a first embodiment of the invention, the first tubular zone, the second tubular zone and the elastically deformable part are formed on the same part called the exterior body, said exterior body has an interior surface, said interior surface has in the vicinity of the elastically deformable part a shoulder having an axial support surface contiguous with a peripheral lateral surface, and the interface comes to bear on said axial support surface and to bear on said peripheral lateral surface by force fitting.

In another embodiment of the invention, the first tubular zone, the second tubular zone and the elastically deformable part are made on two distinct parts. In this case, different variants can be envisaged.

In a first variant, a first part includes the first tubular zone, the elastically deformable part and possibly part of the second tubular zone; a second part corresponds to the major portion of the second tubular zone, and the interface has an annular zone, the outside diameter of which corresponds to the outside diameter of the second tubular zone, said annular zone being placed between the first part and the second part.

In a second variant, a first part includes the first tubular zone, the elastically deformable part and possibly part of the second tubular zone, a second part corresponds to the major portion of the second tubular zone, the first part has an interior surface, said interior surface has in the vicinity of the elastically deformable part a shoulder having an axial support surface contiguous with a peripheral lateral surface, and the interface comes to bear on said axial support surface and to bear on said peripheral lateral surface by force fitting.

Finally, in a third variant, a first part includes the interface and the first tubular zone, the elastically deformable part and possibly part of the second tubular zone, and a second part corresponds to the major portion of the second tubular zone.

The device of the present invention described hereinabove is a glow plug, for example.

Finally, the present invention relates to an internal combustion engine that includes a device as described hereinabove.

BRIEF DESCRIPTION OF THE DRAWINGS

Details and advantages of the present invention will emerge more clearly from the following description, given with reference to the appended diagrammatic drawings, in which.

DETAILED DESCRIPTION OF THE PREFERRED EMBODIMENTS

The following description is given with reference to a glow plug integrating a pressure sensor. However, the invention described here relates equally to pressure measuring devices sometimes referred to as stand-alone pressure sensors (SAPS). This type of device is used in diesel engines (generally large cubic capacity engines) and petrol engines, for example, to measure the pressure in the combustion chambers of the engine without being integrated into a glow plug or spark plug. A dedicated well is then provided for fitting the device for each combustion chamber concerned.

Figure 1:
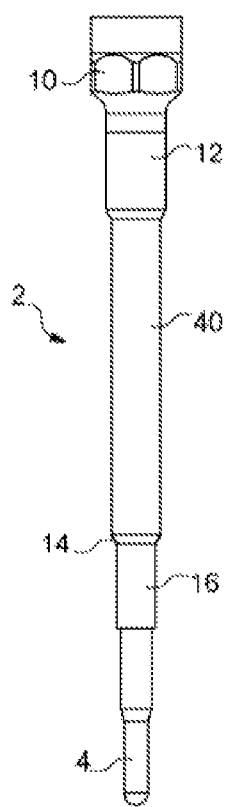
FIG. 1 is an exterior view of a prior art glow plug.
Figure 2:
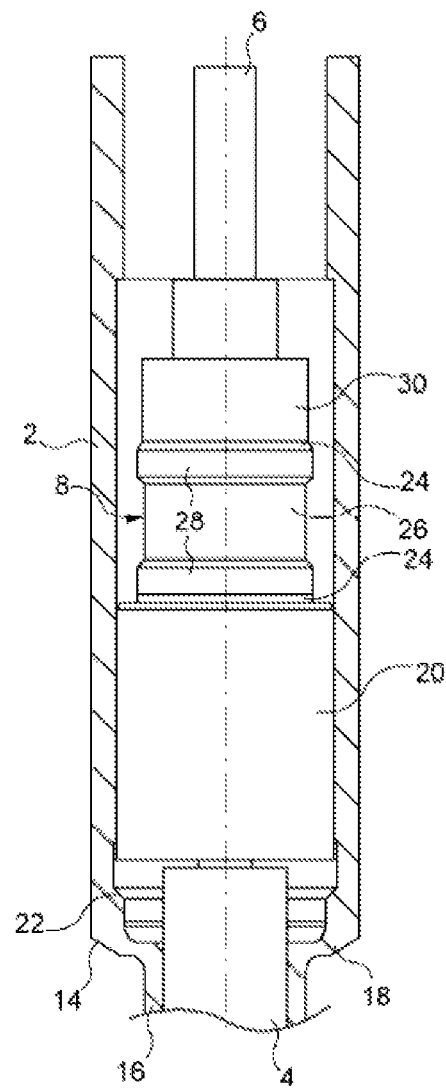
FIG. 2 is a partial view to a larger scale in which the exterior body of the glow plug has been cut away to show a pressure sensor and a seat for the prior art glow plug from FIG. 1.

The prior art glow plug represented in FIGS. 1 and 2 is the glow plug disclosed in the document FR 2 884 299. This glow plug includes, in a manner known to the person skilled in the art, a body 2, a finger 4, a core 6 and a pressure sensor 8.

The body 2 is of tubular shape and features a plurality of circular cylindrical segments. At a first end, called the glow plug head 10, the glow plug body has a holding zone with an exterior surface of hexagonal cross section. This holding zone is used for fitting and removing the glow plug by screwing/unscrewing it. For fitting it, a threaded zone 12 is provided adjacent to the glow plug head 10. A corresponding thread is provided in a cylinder head of an engine to cooperate with the threaded zone 12. To perfect the seal between the cylinder head and the glow plug, there is also provision for forming a sealing cone 14 on the body 2. This cone cooperates with a complementary conical surface formed in the cylinder head and, through shapes that fit together, provides an excellent seal between the two parts.

On the opposite side to the glow plug head, the glow plug body 2 carries the latter's finger 4. This finger is intended to be placed in a combustion chamber of the corresponding engine. This finger 4 forms the heating element of the glow plug.

As represented in the drawings, the finger 4 is preferably a ceramic finger. This type of finger is known to the person skilled in the art and is not described in more detail here. It produces a small heating element. The finger 4 could also be for example a metallic finger. This finger 4 is fed with electrical current by the core 6 that passes through the body 2 of the glow plug. In the region of the glow plug head 10, a connection (not shown) is provided for connecting the core 6 to a source of electrical current.

The opposite end of the glow plug body 2 to the glow plug head carries the finger 4. This end is a zone of circular cylindrical section, the inside diameter of which is adapted to the outside diameter of the finger 4. The finger 4 is brazed to the end 16 of the glow plug body 2, for example. The brazing can be effected over the entire height of the end 16, the diameter whereof is adapted to the diameter of the finger 4. Brazing fastens the finger 4 to the end 16 of the glow plug body 2. Other techniques could be used here to fasten the finger 4 to the end 16 of the body 2. The lower part of the glow plug body 2 comprising the end 16 can be made from a material suitable for brazing. This material preferably has a coefficient of expansion close to that of the ceramic used to produce the finger 4. Thus the glow plug body 2 can be an assembly of several parts. Note that the body 2 represented in FIG. 2 includes a junction plane corresponding to the assembly of two parts welded to each other to form the body 2.

The end 16 of the glow plug body 2 forms a connecting zone between the glow plug body 2 and the finger 4. This connecting zone is connected to the rest of the glow plug body 2 by an elastically deformable part of the body, this elastic part being called the membrane 18 hereinafter. The connection of the end 16 to the rest of the glow plug body 2 is effected, through the intermediary of the membrane 18, in the region of the sealing cone 14.

The membrane 18 takes the form of an annular washer located in a plane perpendicular to the axis of the glow plug body 2. It is produced by thinning of material and here forms a single part with the end 16 of the body 2. The thickness of the membrane (measured in the longitudinal direction) is of the order of 0.3 mm, for example. This thickness is less than the thickness of the wall of the body 2. This latter thickness can be from 0.5 mm to 1 mm, for example. The width of this membrane 18 is of the order of 0.5 mm. In this numerical example, this means that the difference between the outside radius of the membrane 18 and the inside radius thereof is 0.5 mm.

As can be seen in FIG. 2, the large diameter outside edge of the membrane 18 is connected to the sealing cone 14. The part of the glow plug body 2 situated between the sealing cone 14 and the threaded zone 12, including that threaded zone, is a rigid zone. This zone is mounted in the corresponding cylinder head and it is assumed that it is fixed. If axial forces are exerted on the finger 4, the membrane 18 flexes and the finger 4, and likewise the end 16 of the body 2, are displaced in the longitudinal direction. Thus on one side of the membrane 18 there is a zone of the glow plug body 2 that is assumed to be fixed and on the other side a movable zone. Thus the membrane 18 decouples these two zones.

If pressure is exerted inside the corresponding cylinder, that pressure exerts on the finger 4 a force tending to cause it to move into the glow plug body 2. This pressure is measured by the pressure sensor 8. This is a piezo-electric sensor.

The pressure sensor 8 is mounted between a fixed part fastened to the immovable part of the glow plug body 2 and a movable part fastened to the finger 4.

The fixed part is called the interface 20 hereinafter. It is a tubular member of circular cylindrical shape. Its shape and its dimensions are adapted so that it can be housed inside the tubular body 2 and to provide a passage for the core 6. This interface 20 is positioned in the glow plug body 2 just above the sealing cone 14. This part is therefore very close to the finger 4. A seat 22 is provided in the interior surface of the glow plug body 2 to receive the interface 20.

The pressure sensor 8 is placed on the interface 20, i.e. on the same side as the glow plug head 10. In the conventional way, an electrically insulating member 24 is located between the interface 20 and the piezo-electric sensor 8. That sensor comprises a piezo-electric element 26 located between two contact elements 28 of electrically conductive material. Each of these contact elements 28 is provided with a connecting grid (generally known as a "lead frame") that is molded over it and in the shape of a portion of a cylinder. These connecting grids are not represented in the drawing. Here more conventional connecting terminals can also be provided.

Above the pressure sensor 8 is the movable part referred to hereinabove. Here it is a ring 30. The latter is also electrically insulated from the pressure sensor 8 by means of an electrically insulating member 24. The ring 30 is welded to the core 6, for example by laser welding.

In the rest state, if no pressure is exerted on the finger 4, the pressure sensor 8 is loaded. If a pressure is exerted on the finger 4, the loading on the pressure sensor 8 is reduced and the pressure sensor measures this variation in loading.

Figure 3:
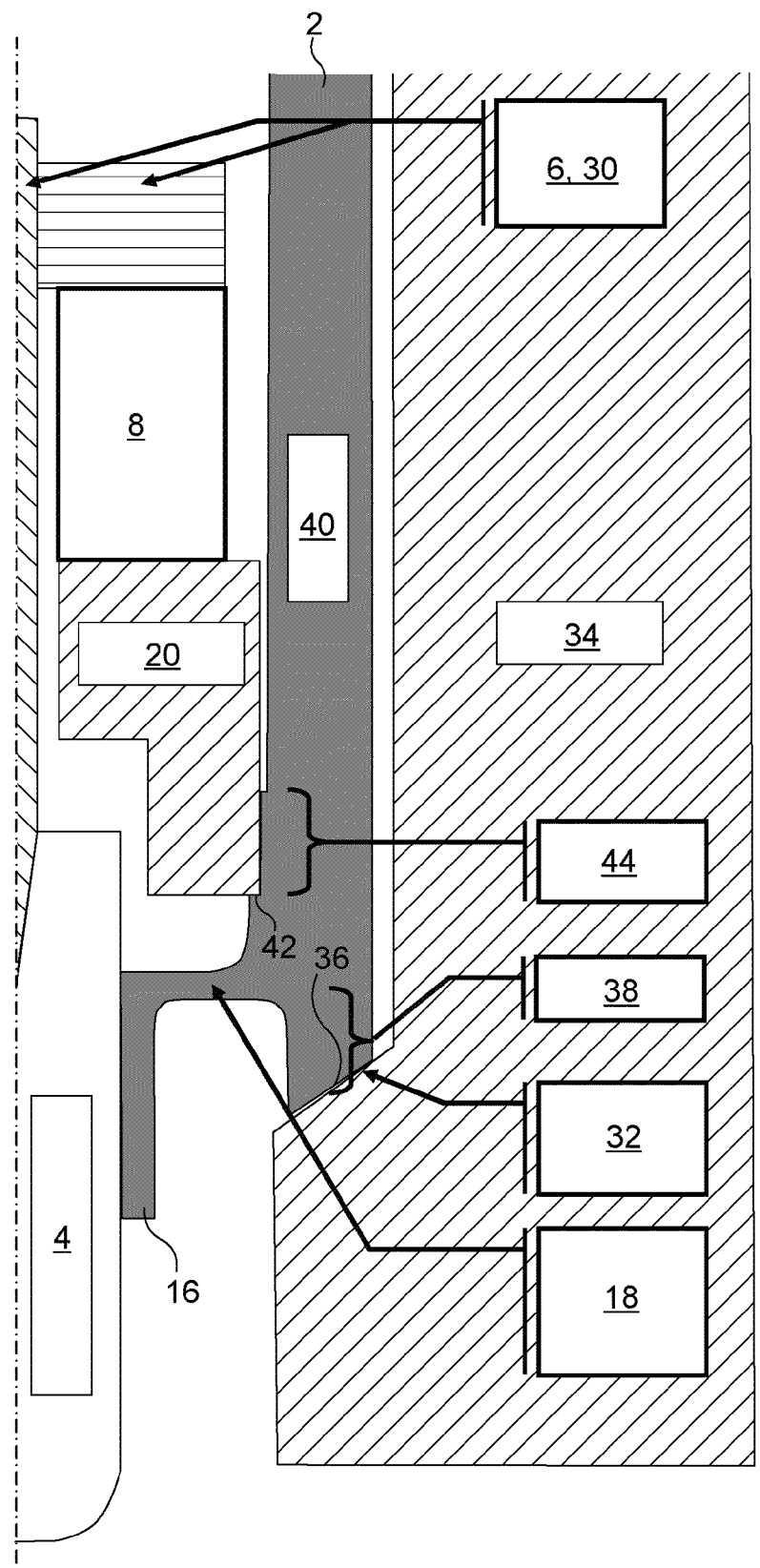
FIG. 3 is a diagrammatic half-view in longitudinal section of a device of the invention integrating a pressure sensor mounted in a cylinder head and showing a pressure sensor and the bearing of the device on a conical seat of the cylinder head, and FIGS. 4A, 4B and 4C each correspond to a partial view of FIG. 3 and show variants of a device of the present invention.

FIG. 3 shows a glow plug of the present invention. This glow plug has the same main components described hereinabove arranged in the same way. The differences between the prior art glow plug described above with reference to FIGS. 1 and 2 and the glow plug of the invention shown in FIG. 3 concern, on the one hand, the zone in which the glow plug body 2 bears on a seat 32 produced in a cylinder head 34, i.e. at the sealing cone 14 of the prior art and, on the other hand, the connection between the interface 20 and the outer envelope of the glow plug, i.e. at the prior art seat 22.

The glow plug shown in FIG. 3 includes a bearing surface 36 intended to cooperate with the seat 32 of the cylinder head 34. In an original way, this bearing surface 36 is produced at the free end of an annular skirt 38 that surrounds the upper portion of the end 16.

It is assumed in the present description that the glow plug described has a longitudinal axis located vertically and that the glow plug head 10 is at the top and the finger 4 at the bottom.

The bottom end 16 of the body takes the form of a first tubular zone. It receives inside it the finger 4 as described above for the prior art glow plug. In the case of a stand-alone pressure sensor, the tubular end 16 and the finger 4 are generally made of a single part.

The body 2 also has a second tubular zone 40 having a circular cylindrical exterior surface and forming with the first tubular zone, or end 16, an exterior envelope around the finger 4 and the pressure sensor 8. This kind of tubular zone is also present in the prior art glow plug of FIGS. 1 and 2. It extends between the threaded zone 12 and the zone in which the glow plug bears on the seat 32 of the cylinder head 34.

The first tubular zone corresponding to the end 16 of the body 2 and the second tubular zone 40 of the body 2 are connected together by the membrane 18. As is clear in particular from the drawing, the outside diameter of the second tubular zone 40 is greater than the outside diameter of the end 16, which also has a circular cylindrical exterior surface.

In the FIG. 3 embodiment, the skirt 38 extends the second tubular zone 40. This skirt 38 has a thickness which is at most the same as the thickness of the body in the second tubular zone 40 so as not to cause any risk of impeding the functioning of the membrane 18.

The height of the skirt 38, for example relative to the membrane 18, is of the order of a few millimeters at most. Its height is between 1 and 2 mm, for example.

According to the present invention, the connection between the interface 20 and the second tubular zone includes a zone of axial contact.

In the FIG. 3 embodiment, the body 2 has, in the bottom portion of the second tubular zone 40, preferably as close as possible to the membrane 18, an interior shoulder having an axial support surface 42 and a lateral bearing surface 44. The interface 20 has to be fastened to the second tubular zone 40, which is assumed to be fixed. The interface 20 is mounted by force inside the second tubular zone 40. This locks the interface 20 into the second tubular zone 40, thus fastening the interface 20 to the fixed part of the body 2.

The interface 20 also comes to bear on the axial support surface 42 to lock the membrane on tightening the glow plug into its bore without preventing the membrane from being deformed elastically for the measurement of pressure by the finger 4. When a tightening torque is applied to the body 2 of the glow plug, the bearing surface 36 encounters the seat 32. Because of the conical shape of the seat 32 and the bearing surface 36, reaction forces having, on the one hand, an axial component and, on the other hand, a radial component are exerted on the body 2, more particularly in the zone of contact between the body 2 and the seat 32. These forces generate a torque that tends to pivot the membrane 18 upward (i.e. toward the glow plug head). Accordingly, as a function of the tightening torque applied to the body of the glow plug to fit it into the cylinder head, a greater or lesser induced torque is transmitted to the membrane 18. This induced torque acts on the prestressing of the pressure sensor 8 and tends to eliminate that prestressing.

The presence of the axial support surface 42 prevents upward pivoting of the membrane 18. The interface 20, which is immobilized by virtue of its being fitted by force into the second tubular zone 40, comes to bear on said axial support surface 42 and serves as an abutment for the membrane 18.

To limit the impact of deformation of the cylinder head 34 on the pressure measurements from the pressure sensor 8, the actual bearing surface 44 is, on the one hand, as close as possible to the membrane 18, i.e. as far away as possible from zones of the cylinder head where such deformation occurs, and, on the other hand, of limited height compared to the total height of the second tubular zone 40, so as to limit the impact of such deformation on the interface 20.

Figure 4A:
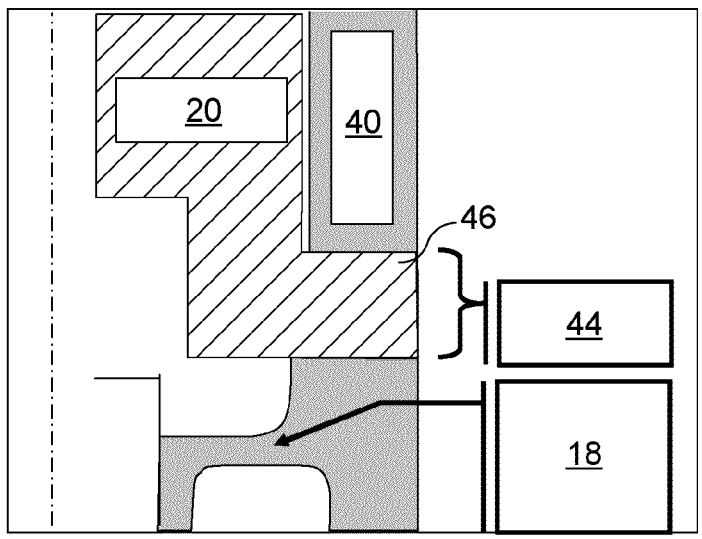
Figure 4B:
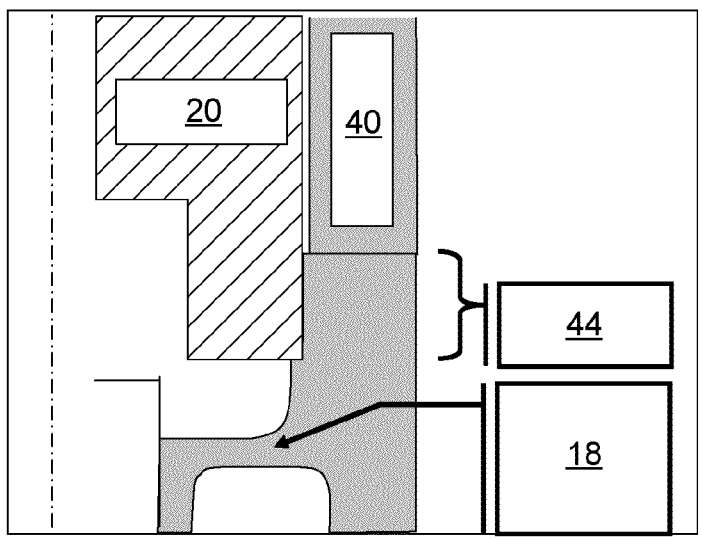
Figure 4C:
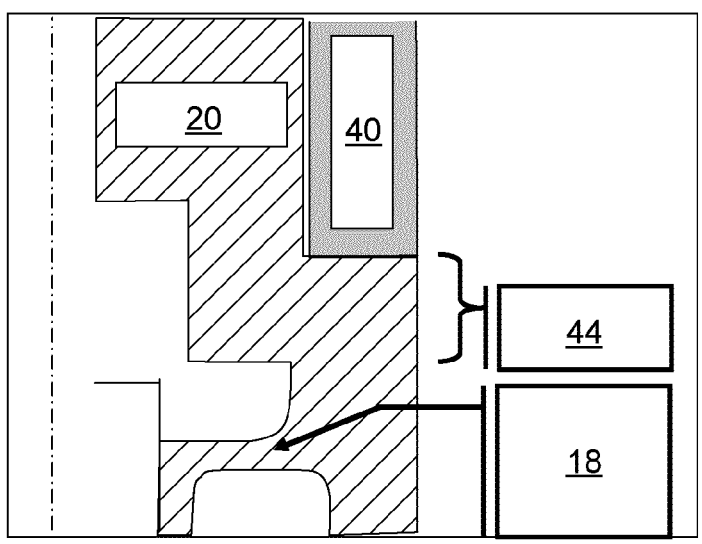

The variants of FIGS. 4A, 4B and 4C have the same functions: they prevent upward pivoting of the membrane 18 and limit the impact of deformation of the cylinder head on the measurement of the pressure by the pressure sensor 8.

In these three variants, the exterior envelope of the glow plug formed by the first tubular zone, or end 16, the membrane 18 and the second tubular zone 40 is formed of two distinct parts whereas in the first embodiment, shown in FIG. 3, these various members were grouped into the same component.

The FIG. 4A variant provides for a first portion of the exterior envelope to comprise the first tubular zone, or end 16, the membrane 18 and the bottom end of the second tubular zone 40, which here includes in particular the skirt 38. The second portion of the exterior envelope corresponds to the remainder of the second tubular zone 40. Here the interface 20 has an annular zone 46 that is accommodated between the first and second portions of the exterior envelope. The exterior surface of the annular zone 46 is preferably a circular cylinder of the same diameter as the exterior surface of the second tubular zone 40 so that the exterior surface of the body 2 is continuous.

Compared to the FIG. 3 embodiment, the axial support surface is larger because it extends to the exterior face of the body of the glow plug. Here the interface 20, compared to the FIG. 3 embodiment, integrates a portion of the second tubular zone 40.

The FIG. 4B embodiment is close to that of FIG. 3. The configuration is the same but a portion of the second tubular zone 40 forms a part distinct from the rest of the exterior envelope comprising the second tubular zone 40, the membrane 18 and the end 16.

Compared to the variants of FIGS. 4A and 4B, the FIG. 4C embodiment provides for the interface to integrate the membrane 18 and the end 16 that forms the first tubular zone.

In all these variants (FIGS. 3 to 4C), the reference number 44 designates the connection zone of the interface 20 with the exterior envelope. This connection zone corresponds either to a lateral bearing surface or (see FIGS. 4A and 4C) to the zone in which the interface 20 forms a bridge between the interior of the glow plug and its exterior. As mentioned above, this connection zone is preferably as close as possible to the membrane 18 and of small height compared to the second tubular zone 40.

To prevent the membrane 18 pivoting when a tightening torque is applied to the body 2 of the glow plug, the thickness (measured radially) of the exterior wall of the glow plug just below the connection zone is greater than the thickness of the exterior wall just above the connection zone. Given that the exterior surfaces are aligned, the wall therefore extends further inwards under the connection zone than above it, thereby immobilizing the membrane against rotation.

The present invention is not limited to the embodiment described hereinabove and to the variants referred to. It also concerns all variants evident to the person skilled in the art.

Thus, for example, all of the numerical data provided is given by way of illustrative and nonlimiting example only.

Also, in the embodiments described, the body of the glow plug has a skirt where this body bears on a seat in the cylinder head. The present invention can equally apply to a glow plug having no such skirt.

The present invention can be implemented equally well with an exterior body (glow plug or SAPS) made in one piece or in several pieces.

The invention claimed is:

1. A device integrating a pressure sensor for measuring pressure in an internal combustion engine, the device comprising:
   a first tubular zone extending along a center axis;
   a finger fixed inside the first tubular zone;
   a second tubular zone having a greater outside diameter than the first tubular zone and extending the first tubular zone; and
   an annular elastically deformable part lying in a plane transverse to the center axis and the first tubular zone and connecting the first tubular zone to the second tubular zone;
   a member fastened to the finger; and
   a fixed interface fastened to the second tubular zone,
   wherein the pressure sensor is located between the member fastened to the finger and the fixed interface fastened to the second tubular zone, and
   the interface has a first zone of axial contact with a portion of the second tubular zone, the first zone of axial contact extending transverse to the center axis, the interface being configured to prevent upward pivoting of the annular elastically deformable part by the zone of axial contact with the second tubular zone,
   wherein the interface further has a second zone of lateral contact corresponding either to a lateral bearing zone between the interface and an interior face of the second tubular zone or to a zone of the interface having an outside diameter corresponding to an outside diameter of the second tubular zone, and
   the second zone of lateral contact has a small height compared to the interface so that the interface has a third zone above the second zone of lateral contact, in which there is a gap between the third zone and an exterior wall, the second tubular zone of the exterior wall having a region of least thickness facing the interface above the second zone of lateral contact.

2. The device according to claim 1, wherein the member fastened to the finger is pre-stressed on the pressure sensor, and
   the stress exerted on the pressure sensor lessens when the finger is subjected to an exterior pressure.

3. The device according to claim 1, wherein the second zone of lateral contact has a smaller height in relation to a height of the second tubular zone.

4. The device according to claim 1, wherein the axial contact zone is disposed adjacent to the elastically deformable part.

5. The device according to claim 1, wherein the first tubular zone, the second tubular zone, and the elastically deformable part are made on an exterior body of the device, the exterior body having an interior surface, and
   the interior surface has, in the vicinity of the elastically deformable part, a shoulder having an axial support surface contiguous with a peripheral lateral surface, and
   the interface comes to bear on the axial support surface and the peripheral lateral surface by force fitting.

6. The device according to claim 1, wherein the device is a glow plug.

7. An internal combustion engine, comprising a device according to claim 1.

8. The device according to claim 1, wherein the elastically deformable part forms a single part with the first tubular zone.

9. The device according to claim 8, wherein the part integrating both the elastically deformable part and the first tubular zone has at least one zone of a same outside diameter as the second tubular zone.

10. The device according to claim 1, wherein the first tubular zone, the second tubular zone, and the elastically deformable part are formed on two distinct parts.

11. The device according to claim 10, further comprising:
    a first part that includes the first tubular zone, the elastically deformable part, and part of the second tubular zone; and
    a second part that corresponds to a major portion of the second tubular zone,
    wherein the interface has an annular zone, an outside diameter of which corresponds to an outside diameter of the second tubular zone, said annular zone being disposed between the first part and the second part.

12. The device according to claim 10, further comprising:
    a first part that includes the first tubular zone, the elastically deformable part, and part of the second tubular zone, and
    a second part that corresponds to a major portion of the second tubular zone,
    wherein the first part has an interior surface, the interior surface having, in the vicinity of the elastically deformable part, a shoulder having an axial support surface contiguous with a peripheral lateral surface, and
    the interface comes to bear on said axial support surface and said peripheral lateral surface by force fitting.

13. The device according to claim 10, further comprising:
    a first part that includes the interface, the first tubular zone, the elastically deformable part, and part of the second tubular zone; and
    a second part that corresponds to a major portion of the second tubular zone.

14. The device according to claim 1, wherein
    a thickness of an exterior wall of the device between the annular elastically deformable part and the interface, below the second zone of lateral contact, is greater than a thickness of the exterior wall of the device just above the second zone of lateral contact zone.

15. The device according to claim 14, wherein the elastically deformable part forms a single part with the first tubular zone.

16. The device according to claim 14, wherein the member fastened to the finger is pre-stressed on the pressure sensor, and
    the stress exerted on the pressure sensor lessens when the finger is subjected to an exterior pressure.

17. The device according to claim 14, wherein the interface includes a lateral contact zone having a smaller height in relation to a height of the second tubular zone.

18. The device according to claim 14, wherein the axial contact zone is disposed adjacent to the elastically deformable part.

19. The device according to claim 14, wherein the first tubular zone, the second tubular zone, and the elastically deformable part are made on an exterior body of the device, the exterior body having an interior surface, and
    the interior surface has, in the vicinity of the elastically deformable part, a shoulder having an axial support surface contiguous with a peripheral lateral surface, and
    the interface comes to bear on the axial support surface and the peripheral lateral surface by force fitting.

20. The device according to claim 14, wherein the first tubular zone, the second tubular zone, and the elastically deformable part are formed on two distinct parts.

* * * * *